April 16, 1935.  P. G. WAGNER  1,997,878
PIPE PLUGGING DEVICE
Filed May 8, 1933   2 Sheets-Sheet 1
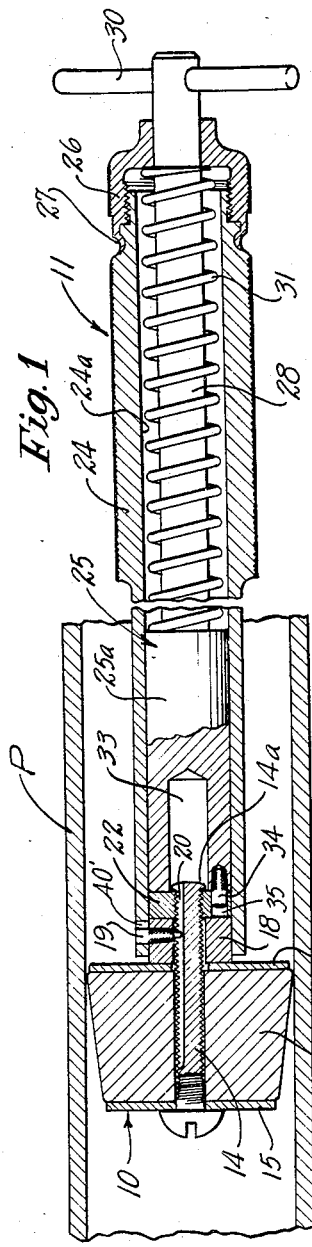
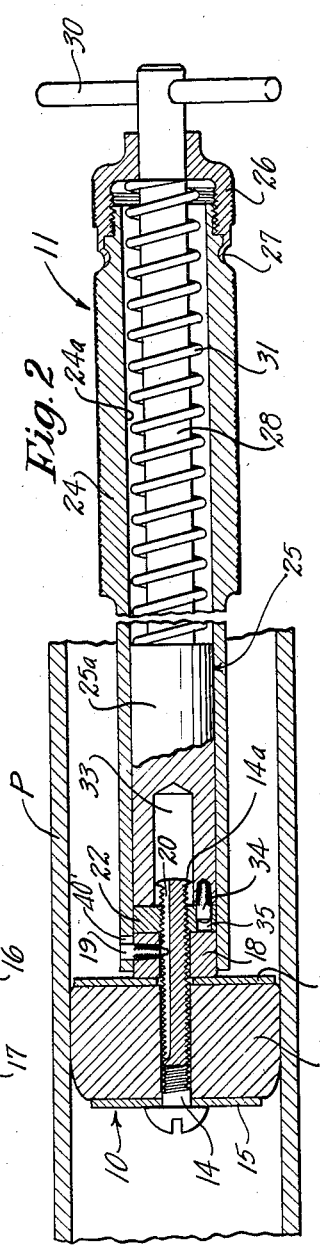
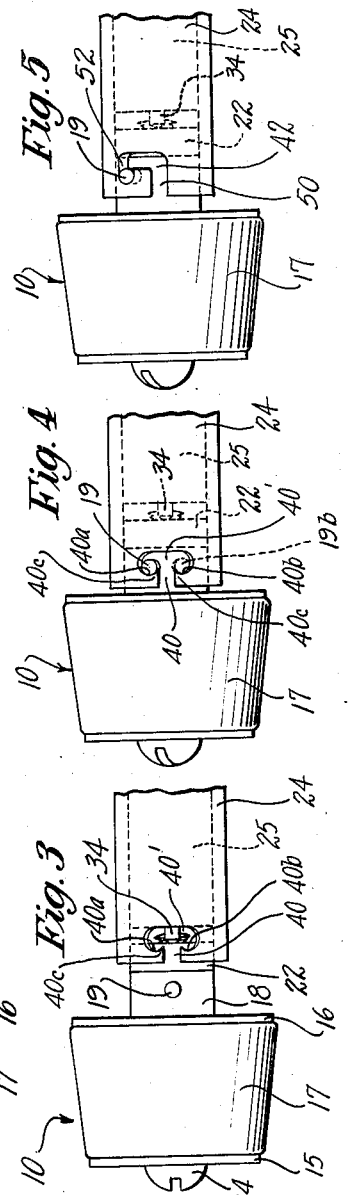
Inventor
Paul G. Wagner.
Attorney.

April 16, 1935.   P. G. WAGNER   1,997,878
PIPE PLUGGING DEVICE
Filed May 8, 1933   2 Sheets-Sheet 2
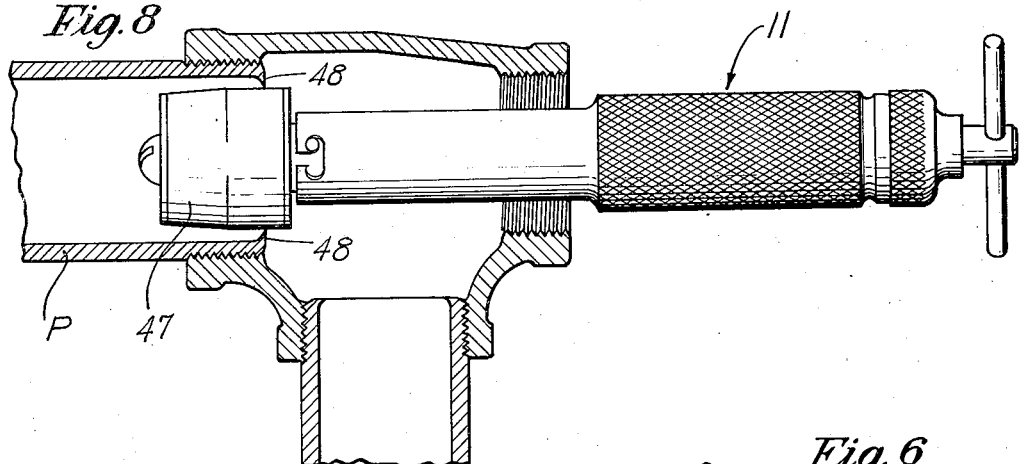
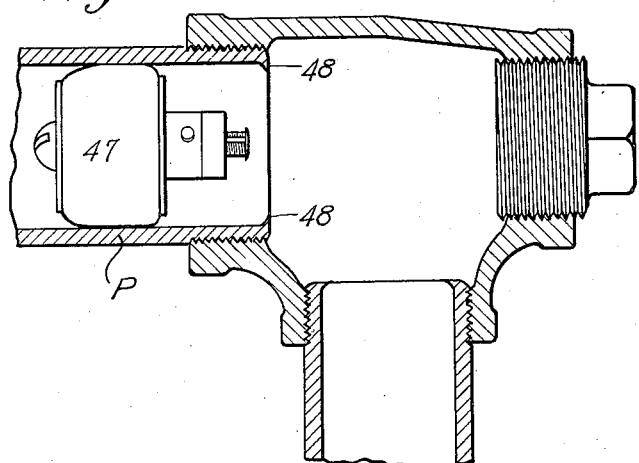
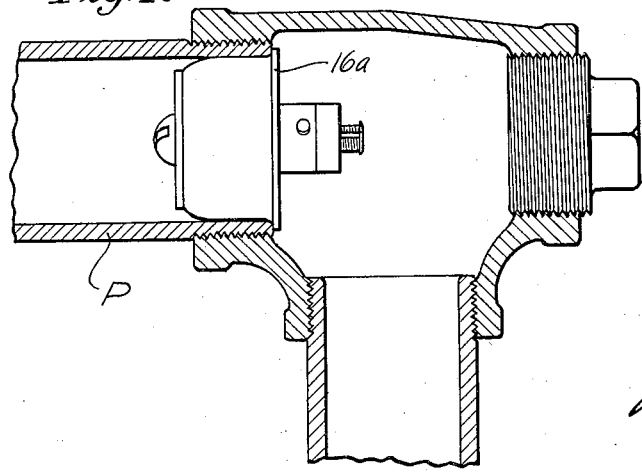
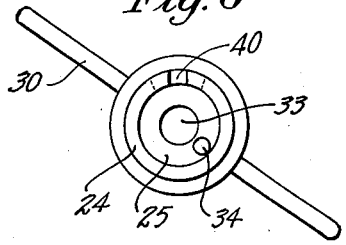
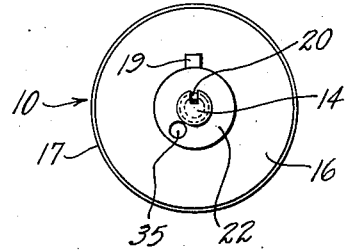
Inventor
Paul G. Wagner.
Attorney.

Patented Apr. 16, 1935

1,997,878

UNITED STATES PATENT OFFICE 1,997,878

PIPE PLUGGING DEVICE

Paul G. Wagner, Los Angeles, Calif.

Application May 8, 1933, Serial No. 669,930

14 Claims. (Cl. 137—76)

This invention relates to devices for plugging pipes to form a seal against fluid flow, as when service through the pipe has been temporarily discontinued. This need arises particularly in the case of gas service lines, and is a typical instance.

When tenants move from a house and it remains vacant for a period of time, there is the possibility of loss of gas by theft since no responsible occupant can be charged with any amount used. There is also the danger from leakage from poor gas cocks or valves which are not completely closed. Leaking gas is not only a loss, but it accumulates in the vacant house and constitutes a grave potential danger to individuals subsequently entering, unaware of the accumulation. For these reasons, it is frequent practice to seal the house service lines in some manner if the house is likely to remain vacant even for a short time.

The usual sealing means comprises a shut off disk inserted in a union adjacent the meter, at best an unsure seal. These disks may be easily removed by gas-thieves, or by itinerants, thus failing in their purpose and leading both to loss of gas and a reexposure to the danger of gas accumulating from open or leaking valves.

In the event of an explosion or other accident resulting from such gas accumulations, it is incumbent upon the gas company to prove that the seal was actually and properly installed; and it is a difficult burden to overcome the presumption of negligence arising from the circumstances.

Therefore, an object of my invention is to provide a sealing device in the form of a plug set well in from accessible joint openings, that will provide an effective and non-leaking seal, and also will provide a device such that the plug itself cannot be poorly installed or incompletely set in place so as to leak. The inherent character of the plug is such that, when set, it necessarily becomes a complete bar to passage of fluid, and cannot be left in the pipe, unless properly placed, so that negligence or carelessness on the part of a workman cannot leave a closure in an unreliable condition. Thus, with a record kept that a plug has been set in a given line, there is prima facie evidence that a proper seal was effected and the gas company is relieved of the charge of negligence.

It is also an object of my invention to provide a plugging device having particular means for placing the plug, and without which the plug cannot be removed, at least except with great difficulty. Removal of the closure by unauthorized persons is thus made of sufficient difficulty to prevent theft of gas and the attendant possibilities of leakage.

A further object is to provide a plug that may be inconspicuously placed within the pipe in such a manner that the pipe fittings can be replaced, thus hiding the plug and making it difficult of access. This also contributes to safety from tampering by wrong-doers.

These objects are accomplished in a plugging device characteristic of my invention by providing a plug with an expansible body that, by the application of longitudinal pressure may be expanded into gripping contact with the pipe walls.

The resilient nature of the body enables it to fit exactly the contour of the pipe interior to effect a perfect seal. The plug also includes a stationary member, by which the plug may be held, and a rotatable member which, when turned, moves longitudinally to compress or release the body.

This plug is attached to a setting tool adapted to turn the rotatable plug member to expand the plug or contract it, and also to serve as a handle for locating the plug at the desired point in the pipe. This tool comprises a stationary barrel or body and a movable interior shaft, engageable respectively with the stationary and rotatable plug members to expand or contract the plug within the pipe.

This engagement of the plug and tool is accomplished by relative rotation of the respective stationary members; and since the plug when in the pipe will turn bodily with the setting tool until it is expanded into gripping contact with the pipe wall and so held fixed, and as no other means of holding the plug can be applied, the setting tool cannot be disengaged and withdrawn alone until the plug is properly set in place.

How the above and other objects and advantages of my invention are accomplished will be better understood by reference to the drawings and the following description wherein I show and describe typical embodiments of my invention.

In the drawings:

Fig. 1 is a longitudinal median section of my improved pipe plugging device showing an unexpanded plug inserted within a pipe;

Fig. 2 is a view similar to Fig. 1 showing the plug expanded and set in place;

Fig. 3 is a fragmentary elevation of a plug and one end of the setting tool showing the parts in the positions occupied as the plug is being attached to the tool;

Fig. 4 is a view similar to Fig. 3 showing the parts in different positions;

Fig. 5 is a view similar to Fig. 3 but illustrating a variational form of attaching slot on the setting tool;

Fig. 6 is an end view of the setting tool;

Fig. 7 is an end view of a plug;

Fig. 8 illustrates a variational form of plug body and shows a typical placement of the plug;

Fig. 9 is a view similar to Fig. 8 after the plug has been set in position; and

Fig. 10 illustrates another variational form of plug.

The plugging device has two main parts, the plug generally indicated in Fig. 1 at 10 and the setting tool generally indicated at 11. The plug comprises a mandrel in the form of threaded bolt 14 upon which are mounted washers 15 and 16 to provide shoulders at either side of plug body 17, which body is formed of rubber or of other suitable resilient and expansible material. These members are loosely mounted upon the bolt so as to be free to slide over the bolt threads but limited by the head of bolt 14 which forms a stop for washer 15 and body 17. Body 17 is preferably tapered or frusto-conical in shape, the largest diameter being substantially the interior diameter of the pipe which it is wished to plug, tho this is not essential in certain situations as will be made apparent; and washers 15 and 16 are preferably of a diameter slightly less than the adjacent ends of the body. Beyond washer 16 is collar 18 slidably mounted upon bolt 14 but held against rotation thereabout by pin 19 which projects through the collar into keyway 20 cut longitudinally of the bolt. Pin 19 extends for a distance above the periphery of collar 18 so that it may be taken by a member of the setting device and thereby serve as a means to hold the mandrel against rotation, for reasons that will become apparent. Cylindric nut 22 is threaded onto the bolt adjacent collar 18, and the end of the bolt is headed over at 14a to provide a stop shoulder preventing subsequent removal of the nut.

Setting tool 11 comprises a hollow cylindrical barrel body 24, within the bore 24a of which a shaft, here in the form of plunger 25, is capable of rotation and limited longitudinal movement. One end of barrel 24 is closed by cap 26 which, after assembly, may be affixed against accidental removal by indenting a flange portion into a circular groove in body 24 as at 27. Plunger 25 has head portion 25a, having sliding fit in bore 24a, and stem portion 28 which has bearing in cap 26; and the plunger carries at its outer end cross bar 30 that acts as a handle by means of which to operate the plunger. Pin 28 is surrounded by compression spring 31 which bears at opposite ends against head 25a and cap 26 to press the plunger towards the open end of barrel 24, the travel being limited by engagement of cross bar 30 with cap 26. Fig. 3 indicates the plunger at the limit of its travel. As illustrated in Figs. 1 and 6, the end of plunger head 25a is provided with a central bore 33 adapted to receive, with clearance, the end of bolt 14, and with a stud pin 34, off-set from the head axis, adapted to fit within socket 35 in nut 22, as will be more fully explained. For purposes of attaching the plug to the setting tool, the end of barrel 24 is provided with a T-shaped slot comprising a longitudinally extending entry portion 40, transverse portion 40', and return portions 40a and 40b at opposite ends of portion 40', as illustrated in Figs. 3 and 4. Return portions 40a and 40b are here shown as defined at points adjacent portion 40 by shoulders 40c over which pin 19 may be cammed in certain situations.

Until the plug is attached to the setting tool, spring 31 normally presses plunger 25 toward the open end of the tool body to the position of Fig. 3. Collar 18 and nut 22 are of a size to slide easily into the bore of body 24 and when this is to be done, the parts are first brought into the position of Fig. 3 with pin 19 in registration with open end of slot 40. Although pin 34 is adapted eventually to be received within socket 35 in nut 22, it is probable that the pin and socket are not in initial registration but that the base of the nut presses against pin 34 as shown. By forcing further longitudinal movement of the plug relative to the setting tool, nut 22, by its engagement with pin 34, moves plunger 25 to the right against pressure in spring 31; and pin 19 moves through slot portion 40 into transverse slot portion 40' when, by a slight rotation of the plug, pin 19 is moved to one end of said transverse portion. Thereupon spring 31 is allowed to move plunger 25 and plug 10 toward the left (Fig. 4) which movement carries pin 19 into return slot portion 40a, the plug and setting tool thereafter being held positively against further relative rotation in given directions and being held yieldingly against relative rotation in opposite directions, i. e., in directions tending to return pin 19 into registry with slot 40. As will be seen, pin 19 will have to be moved longitudinally of tool against the pressure of spring 31 before it can be rotated to ride over shoulder 40c into slot portion 40.

The reason for entering pin 19 in slot 40a rather than 40b is that subsequent rotation of nut 22 (necessary to effect the expansion of the plug, as will be explained) is, prior to the plug actually gripping the pipe, in a direction which, because of the endwise frictional engagement of the nut and collar 18, would tend to rotate the collar in a manner to bring pin 19 out of slot 40b and into registry with slot 40 to thus allow premature disengagement of the plug from the setting tool. With the pin in slot 40a, the same rotation of the nut merely tends to rotate collar 18 in a direction to bring pin 19 against the closed end of said slot which gives the effect desired.

With the plug thus attached to the tool, plunger 25 is rotated by handle 30 until pin 34 comes into registry with socket 35 when the pressure of spring 31 is free to further project plunger 25, thus entering pin 34 into socket 35. The parts are now in the position of Fig. 1 ready for insertion into a pipe and the setting of the plug. When the plug is attached to tool 11, the setting tool becomes a handle by means of which the plug may be inserted into the open end of a pipe P and moved to any desired point, limited by the length of barrel 24, in the pipe for preventing flow of fluid therethrough.

It is to be noticed that plunger 25 is now connected to nut 22 through pin 34 so that rotation of plunger by handle 30 is adapted to rotate said nut, while barrel 24 is connected to mandrel 14, through pin 19 so that the barrel may be utilized to hold the mandrel against rotation. Hence, by grasping the barrel in one hand and handle 30 in the other, said barrel and plunger may be rotated relatively to set up relative rotation of mandrel and nut in a manner which, by virtue of the screw thread connection, sets up relative longitudinal movement between the mandrel and nut.

With a plug of proper size in a pipe (as in Fig. 1. handle 30 is rotated right-handedly (assuming the mandrel threads are right handed), and mandrel 14 is thus drawn to the right (Fig. 2) into bore 33. Washer 15 is also drawn to the right and, because washer 16 is backed up by collar 18 and nut 22, applies longitudinal pressure to resilient body 17, which pressure causes radial expansion of said body to bring its periphery into firm sealing contact with the walls of pipe P, as illustrated in Fig. 2. At the same time this pressure effectively seals the joints between body 17, the washers, and the mandrel. Handle 30 is turned until the operator determines by the resistance encountered that the plug has been sufficiently expanded radially to provide an effective seal against fluid passage within the pipe and to hold the plug against any movement induced by fluid pressure.

When the plug is thus set in the pipe, the pressure of body 17 against the pipe walls holds the plug against rotation and longitudinal movement, and the setting tool may be quickly and easily disengaged from the plug by simply rotating barrel 24. This rotation is allowed since pin 19 remains stationary, causing shoulder 40c of return slot 40a (Fig. 4) to act as a cam which draws the tool body longitudinally towards the plug against the pressure of spring 31. Slot portion 40 is thus brought into registry with pin 19, whereupon spring 31 acts against cap 26 to shift barrel 24 to the right in Fig. 4 to clear slot 40 from pin 19 so the tool may then be withdrawn from the pipe by straight longitudinal movement. Until the plug properly grips the pipe walls as a result of expansion, it moves bodily with the setting tool. Consequently the relative rotation between plug and tool necessary to disengage one from the other cannot be set up until such proper grip is had. As a result, the fact that the operator has effected such disengagement is proof that the plug is properly expanded. An improperly expanded plug cannot be left in the pipe, an obvious advantage.

The angle and length of cam 40c and the strength of spring 31 are factors determining (with the other plug and pipe conditions given) the resistance necessarily overcome before relative releasing movement between the plug and tool may be effected, and so predetermines the torque which may be applied to a set plug by the tool before disengagement of the tool is effected. Hence, they are determinative of the tightness of the plug's grip on the pipe. By altering either of these two factors, the range of plug-tightness within the pipe necessary to effect tool disengagement is likewise altered, but said factors are always of such value that, for a given installation, they will not allow the lower range limit to drop below a degree sufficient to insure a fluid tight closure.

However, it is not essential to the invention, considered in its broader aspects, that the relative longitudinal movement between plug and tool necessary to clear pin 19 from slot 40a, be set up by the cam action of shoulder 40c. Instead, the tool barrel may be thrust toward the plug, compressing spring 31, until shoulder 40c clears pin 19, and the barrel then rotated into register with slot portion 40. This procedure is necessarily followed in a variation described later.

To remove a set plug, the tool is inserted in the pipe and connected to the plug as described before, except that the barrel is rotated reversely to seat pin 19 in return slot 40b as shown in dotted lines at 19b of Fig. 4. This particular seating is chosen because the subsequent rotation of plunger 25 to unscrew nut 22 must be in the opposite direction from the rotation to compress the plug body, and were the pin seated in slot 40a, such rotation would tend to disengage the pin and slot, particularly after nut 22 and shoulder 14a engage one another.

If pin 34 is not in registry with socket 35, handle 30 is turned until spring 31 snaps the pin home into the socket, whereupon further rotation of the handle in the proper direction rotates nut 22 in a manner to move mandrel 14 to the left in Fig. 2, thus relieving plug 17 of its endwise pressure. The inherent elasticity of the plug body causes it to contract radially and to return to its normal size and shape, permitting its withdrawal from the pipe by straight longitudinal pull. Pressure of spring 31 keeps pin 19 in return slot 40b during this withdrawal movement so there is no danger of the plug becoming disengaged from the tool.

As mentioned, nut 22 is preferably secured by shoulder 14a against removal from bolt 14 so that in loosening the plug the bolt and nut will not be inadvertently separated, thus leaving the bolt and plug body in the pipe.

When the return slot shoulder 40c is in the nature of a cam, as so far described, the plug and setting tool may be detached by applying a simple rotational movement of the tool body relative to the plug because shoulder 40c is of a shape to transmit a sufficient longitudinal component of the rotating force to compress spring 31 and allow pin 19 to pass over the shoulder into slot portion 40. The T-shape of the slot gives one return portion to be utilized when the rotation is in one direction, and the other return portion when the rotation is in the other direction, thus giving a closed bearing face for the pin in either direction of tool rotation.

However, where the described cam action is not utilized, a variational form of L-shaped slot 42 may be used, as illustrated in Fig. 5. In this instance, the plug is made up of entry portion 50, transverse portion 51, and the single return portion 52, both sides of the return portion being of a shape that rotational force applied to the tool body produces no longitudinal component; hence the plug can be separated from the tool body only by positive longitudinal movement of the tool prior to the required rotational movement. Therefore, the single return slot suffices irrespective of the direction of rotation of nut 22 as the sides of the one slot provide closed bearing faces for the pin, effective in either direction of tool rotation.

With either the T or L form of slot the same principles apply. In both cases the plug must be expanded to at least a predetermined minimum amount of gripping contact with the pipe walls to resist a given disengaging force applied through the setting tool. In both cases, the resistance to movement by such forces is acquired solely by the friction between the plug and the pipe.

Fig. 8 illustrates the method of placing the plug through a T, and also illustrates a variational form or shape of plug body 47. It frequently happens that the internal diameter of a pipe at the end may be reduced by the presence of burrs, as at 48, caused by the cutting off tool when the pipe was cut to length. When such is the case, a plug as nearly approximating the internal diameter of the pipe as is illustrated in Fig. 1 will not pass burr 48, so a plug 47 of smaller maximum diameter is preferred. The smaller plug body 47 must be expanded a greater distance in proportion to its size, and so the tapering contour of the body is somewhat modified to provide an increased mass of rubber and decrease the amount of expansion required. The forward part of plug body 47 is tapered so as to retain the advantages of such in guiding the plug into a pipe opening, and the rear part of the body is made cylindrical of as large a diameter as will go through burr 48. In this manner the mass of the body is somewhat greater than if it were tapered forwardly from washer 16 and less compression is required to expand the plug into gripping contact with the pipe walls. By placing the plug beyond burr 48 as in Fig. 9, a better seal is obtained than if the burr were indented into the plug body.

The forms above described have been of such a size as to pass through the pipe in order that they may be set anywhere in the pipe within the working range of a given setting tool (which tool may be of any desired length), and preferably somewhat distant from the end of the pipe to make them less conspicuous and to make the removal more difficult, if not impossible, except by means of the same tool with which the plug was set in place. In Fig. 10, there is illustrated a modified form in which washer 16a is enlarged so that it exceeds the internal diameter of the pipe to be plugged. In this manner the plug may be definitely positioned at the end of the pipe.

Having described certain embodiments of my invention, it is to be realized that the drawings and the foregoing description are to be considered as illustrative of rather than restrictive upon broader claims appended hereto, for various changes in form and arrangement of parts may be made by those skilled in the art without departing from the spirit and scope of said claims.

I claim:

1. A pipe plugging device comprising an expansible plug adapted, in its contracted condition, to be inserted within a pipe and then to be expanded into fluid tight engagement with said pipe, a tool for so inserting and then expanding the plug, said tool being detachably connected to said plug, and means preventing unintentional detachment of the tool from the plug after insertion of the plug into the pipe, until said plug is expanded into fluid tight fit with the pipe.

2. A pipe plugging device comprising an expansible plug adapted, in its contracted condition, to be inserted within a pipe and then to be expanded within said pipe, a tool for so inserting and then expanding the plug, said tool being detachably connected to said plug by relative rotation thereof in given directions, and means preventing reverse relative rotation thereof and thereby preventing unintentional detachment of the tool from the plug after insertion of the plug into the pipe, until said plug is expanded a predetermined extent.

3. A pipe plugging device comprising a plug adapted to be expanded into gripping contact with a pipe interior, a tool for expanding the plug in place, and releasable means for operatively connecting the plug to hold the plug and tool against relative rotation; said releasable means comprising a pin, a pin seat, and pin seating means, said seating means releasing the pin from the seat when a torque in excess of a predetermined value is applied by the tool to the plug when expanded into engagement with a pipe interior.

4. A pipe plugging device comprising a plug adapted to be expanded into gripping contact with a pipe interior, a tool for expanding the plug in place, and releasable means for attaching the plug to the tool; said attaching means comprising a pin on the plug, a pin receiving slot having a cam shoulder on the tool, and a spring resiliently holding the pin in the slot and against movement over said cam shoulder.

5. A pipe plugging device comprising a plug adapted to be expanded into gripping contact with a pipe interior, a tool for expanding the plug in place, and releasable means for attaching the plug to the tool to hold the plug and tool against relative rotation; said releasable means comprising a pin, a pin seat, and yieldable pin seating means, said seating means yielding to unseat the pin under a longitudinal force in excess of a predetermined value applied by the tool to the plug when expanded into engagement with a pipe interior.

6. A pipe plugging device comprising a plug adapted to be expanded into gripping contact with a pipe interior, a tool for expanding the plug in place, and means including a pin and a pin confining slot for releasably attaching the plug to the tool, said pin being releasable from the slot when the expanded plug offers a predetermined resistance to movement.

7. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel; and a setting tool to expand the body into contact with the pipe, said tool comprising a member engageable with said non-rotatable plug member to hold the latter against rotation, and a second member engageable with said nut for imparting rotation thereto.

8. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel; and a setting tool to expand the body into contact with the pipe, said tool comprising a barrel engageable with said non-rotatable plug member to hold the latter against rotation, and a shaft movable within the barrel and engageable with said nut for imparting rotation thereto.

9. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel; and a setting tool to expand the body into contact with the pipe, said tool comprising a barrel engageable with said non-rotatable plug member to hold the latter against rotation, and a shaft rotatable within the barrel and engageable with said nut for imparting rotation thereto, said shaft being movable longitudinally within the barrel to effect engagement of said tool members with said plug members.

10. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel; and a setting tool to expand the body into contact with the pipe, said tool comprising a barrel engageable with said non-rotatable plug member to hold the latter against rotation, a shaft rotatable within the barrel and engageable with said nut for imparting rotation thereto, said shaft being movable longitudinally within the barrel to effect engagement of said tool members with said plug members, and a spring in said barrel urging the shaft toward the plug.

11. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel.

12. A pipe plugging device comprising a plug embodying a radially expansive, tubular body, a threaded mandrel within the bore of the body, a shoulder on the mandrel at one end of the body, a nut threaded on the mandrel at the other end of the body and movable along the mandrel toward the shoulder to compress the body longitudinally and thus expand it radially, and a member slidable along but non-rotatably mounted on the mandrel, said slidable member including a collar and a pin projecting beyond the periphery of the collar and also into a keyway in the mandrel.

13. A pipe plugging device comprising a plug adapted to be expanded into gripping contact with a pipe interior, a tool for expanding the plug in place, and releasable means for attaching the plug to the tool; said attaching means comprising a pin on the plug, a T-shaped pin receiving slot in the tool, a cam shoulder at each end of the transverse portion of the slot, and a spring resiliently holding the pin in the slot and against movement over a selected cam shoulder.

14. A pipe plugging device comprising a plug adapted to be expanded into gripping contact with a pipe interior, a tool for expanding the plug in place, and releasable means for attaching the plug to the tool; said attaching means comprising a pin on the plug, an L-shaped pin receiving slot in the tool, said slot having an entry portion, a transverse portion, and a return portion, and a spring resiliently holding the pin in the return portion of the slot and against movement longitudinal of the tool.

PAUL G. WAGNER.